J. FALVEY.
Baited Fish-Hook.

No. 208,581. Patented Oct. 1, 1878.

Witnesses
Otto Stufland
Hugo Brueggemann

Inventor.
Jeremiah Falvey.
by
Van Santvoord & Hauff
his attorneys

N. PETERS, PHOTO-LITHOGRAPHER, WASHINGTON, D. C.

United States Patent Office.

JEREMIAH FALVEY, OF FLATBUSH, NEW YORK.

IMPROVEMENT IN BAITED FISH-HOOKS.

Specification forming part of Letters Patent No. 208,581, dated October 1, 1878; application filed May 3, 1878.

*To all whom it may concern:*

Be it known that I, JEREMIAH FALVEY, of Flatbush, in the county of Kings and State of New York, have invented a new and useful Improvement in Baited Fish-Hooks, which invention is fully set forth in the following specification, reference being had to the accompanying drawing.

This invention relates to certain improvements in baited fish-hooks; and it has for its object, to form upon a fish-hook an artificial bait the body of which will be sufficiently yielding to enable the mouth of the fish to close readily upon it and upon the hook, and at the same time of sufficient toughness to form a durable and indestructible bait, which will remain at all times firmly attached to the hook.

To this end my invention consists in an artificial bait, preferably in the form of an imitation craw-fish, formed of india-rubber, molded upon the shank of the hook and afterward vulcanized, whereby the shank of said hook is embedded in the body of the bait and retained therein, and the hook and bait form a single article.

Heretofore artificial-worm baits have been made of india-rubber or other flexible material and impaled upon a fish-hook in the same manner as an ordinary earth-worm, and worm-baits have been made of woolen yarn or unvulcanized rubber wrapped around the shank of the hook; but in such cases the bait is but imperfectly attached to the hook, and can hardly be considered as an irremovable integral part of the same.

Figure 1:
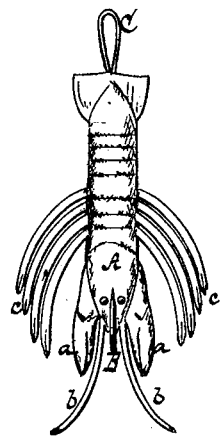
Figure 2:
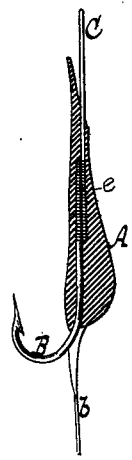

In the drawings, Figure 1 represents a plan or top view of the imitation craw-fish attached to the hook, and Fig. 2 a longitudinal sectional view of the bait and hook.

In the drawings, the letter A represents the artificial bait, which is preferably in form of an imitation craw-fish. Said bait is composed of india-rubber, and molded upon the shank of an ordinary hook, which is attached to a wire or cord, C, provided with a loop at its upper end, by means of a wrapping of thread, as shown at e, Fig. 2.

The ordinary hook is employed, because it is readily available and cheaper than one specially constructed, and also for the reason that in employing the ordinary hook the wire may be firmly embedded in the body of the bait, while the hook itself may, by the exertion of a little force, be turned and brought into any desired position with respect to the body of the bait, which is of advantage in packing and transporting the hooks.

For the purpose of packing, the hook B is turned in a horizontal direction, so that a number of the same can be formed into a convenient package, or a single one can be put into an ordinary letter-envelope and forwarded through the mail.

The bait, after being molded upon the shank of the hook, is vulcanized in the ordinary manner, by means of which it is irremovably secured to the hook, forming an integral part of the same, so that if the hook is broken the entire thing is destroyed.

What I claim as my invention is—

In combination with an artificial bait composed of vulcanized india-rubber, a fish-hook which is capable of being turned, but the shank of which is irremovably embedded in the body of the bait and terminates therein, and a suitable loop embedded therein, substantially as described.

In testimony that I claim the foregoing I have hereunto set my hand and seal this 30th day of April, 1878.

JEREMIAH FALVEY. [L. S.]

Witnesses:
  W. HAUFF,
  E. F. KASTENHUBER.